United States Patent
Cho et al.

(10) Patent No.: US 11,502,289 B2
(45) Date of Patent: Nov. 15, 2022

(54) CARBON-SULFUR COMPOSITE, PREPARATION METHOD THEREFOR, AND LITHIUM SECONDARY BATTERY COMPRISING SAME

(71) Applicants: LG CHEM, LTD., Seoul (KR); INDUSTRY-ACADEMIC COOPERATION FOUNDATION, YONSEI UNIVERSITY, Seoul (KR)

(72) Inventors: Eunkyung Cho, Daejeon (KR); Suenghoon Han, Daejeon (KR); Myeong Jun Song, Incheon (KR); Il To Kim, Seoul (KR); Kwonnam Sohn, Daejeon (KR); Doo Kyung Yang, Daejeon (KR); Jiwon Kim, Seoul (KR); Moo Whan Shin, Seoul (KR)

(73) Assignees: LG ENERGY SOLUTION, LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 261 days.

(21) Appl. No.: 16/646,080

(22) PCT Filed: Sep. 19, 2018

(86) PCT No.: PCT/KR2018/011064
§ 371 (c)(1),
(2) Date: Mar. 10, 2020

(87) PCT Pub. No.: WO2019/066369
PCT Pub. Date: Apr. 4, 2019

(65) Prior Publication Data
US 2020/0259168 A1    Aug. 13, 2020

(30) Foreign Application Priority Data
Sep. 28, 2017 (KR) ......................... 10-2017-0125909

(51) Int. Cl.
*H01M 10/0525* (2010.01)
*H01M 4/587* (2010.01)
*H01M 4/36* (2006.01)
*C01B 32/05* (2017.01)
*H01M 4/38* (2006.01)
*H01M 4/60* (2006.01)
*H01M 4/02* (2006.01)

(52) U.S. Cl.
CPC ............ *H01M 4/364* (2013.01); *C01B 32/05* (2017.08); *H01M 4/38* (2013.01); *H01M 4/587* (2013.01); *H01M 4/60* (2013.01); *H01M 10/0525* (2013.01); *C01P 2004/03* (2013.01); *C01P 2006/12* (2013.01); *C01P 2006/14* (2013.01); *C01P 2006/40* (2013.01); *H01M 2004/028* (2013.01)

(58) Field of Classification Search
CPC ........ H01M 4/364; H01M 4/38; H01M 4/587; H01M 4/60; H01M 10/0525; H01M 2004/028; C01B 32/05; C01P 2004/03; C01P 2006/12; C01P 2006/14; C01P 2006/40
See application file for complete search history.

(56) References Cited

U.S. PATENT DOCUMENTS

| 2015/0236324 | A1* | 8/2015 | Xiao ................... H01M 50/403 429/144 |
| 2017/0012277 | A1 | 1/2017 | Wang |

FOREIGN PATENT DOCUMENTS

| CN | 102751494 A |   | 10/2012 |
| CN | 103456929   | * | 3/2013  |
| CN | 103035893 A |   | 4/2013  |
| CN | 103456929 A |   | 12/2013 |
| CN | 105932230 A |   | 9/2016  |
| KR | 10-2016-0021156 A |   | 2/2016 |
| KR | 10-2017-0030118 A |   | 3/2017 |
| WO | WO 2013/144628 A1 |   | 10/2013 |

OTHER PUBLICATIONS

Kai et. al. Chem. Commun., 2013, 49, 2192-2194 supplemental materials (SM) (Year: 2013).*
Yang et. al. Chemistry of Materials, 2012, 24, 464-470. (Year: 2012).*
CN 103456929 MT (Year: 2013).*
Decision to grant a Patent issued by JPO for Application No. 2020-514193 (Year: 2022).*
Bao et al., "3D Metal Carbide@Mesoporous Carbon Hybrid Architecture as a New Polysulfide Reservoir for Lithium-Sulfur Batteries", Advanced Functional Materials, 2016, vol. 26, No. 47, pp. 8746-8756.
International Search Report for PCT/KR2018/011064 dated Feb. 27, 2019.
Li et al., "Tunable porous structure of metal organic framework derived carbon and the application in lithium-sulfur batteries", Journal of Power Sources, 2016, vol. 302, pp. 174-179.
Xi et al., "Carbon with hierarchical pores from carbonized metal-organic frameworks for lithium Sulphur batteries", Chem. Commun., 2013, vol. 49, pp. 2192-2194.
Extended European Search Report for European Application No. 18860644.6, dated Jul. 16, 2020.
Xi et al., "Supporting information Carbon with hierarchial pores from carbonized metal-organic frameworks for lithium sulphur batteries", The Royal Society of Chemistry, Jan. 30, 2013, XP055712715.

* cited by examiner

*Primary Examiner* — Alexander Usyatinsky
(74) *Attorney, Agent, or Firm* — Birch, Stewart, Kolasch & Birch, LLP

(57) ABSTRACT

A carbon-sulfur composite including a carbonized metal-organic framework (MOF); and a sulfur compound introduced to at least a part of an outside surface and an inside of the carbonized metal-organic framework, wherein the carbonized metal-organic framework has a specific surface area of 1000 m²/g to 4000 m²/g, and the carbonized metal-organic framework has a pore volume of 0.1 cc/g to 10 cc/g, and a method for preparing the same.

8 Claims, 6 Drawing Sheets

【Figure 1】
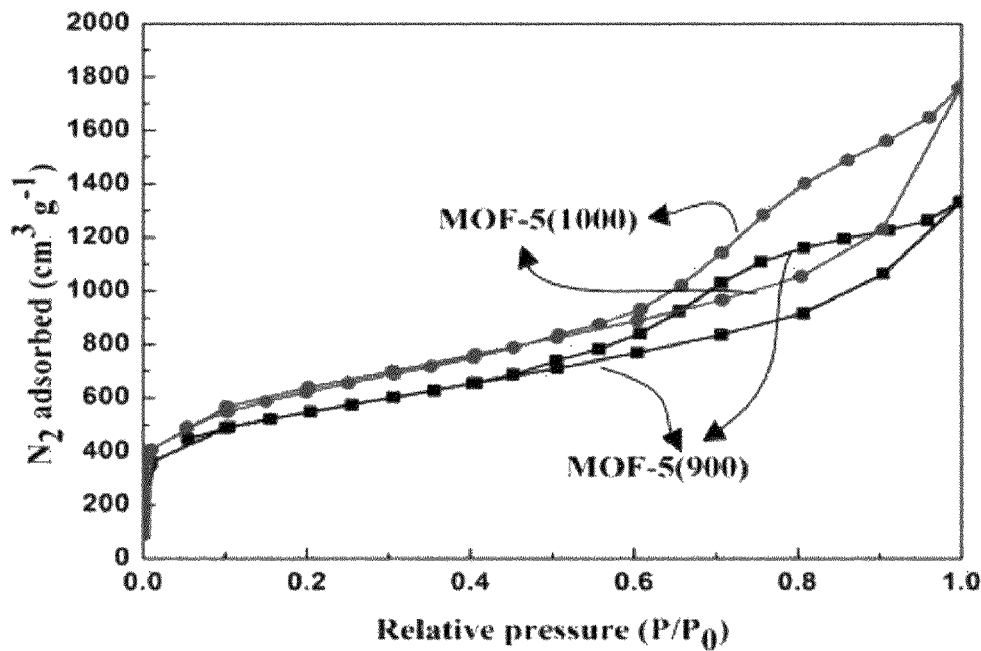
【Figure 2】
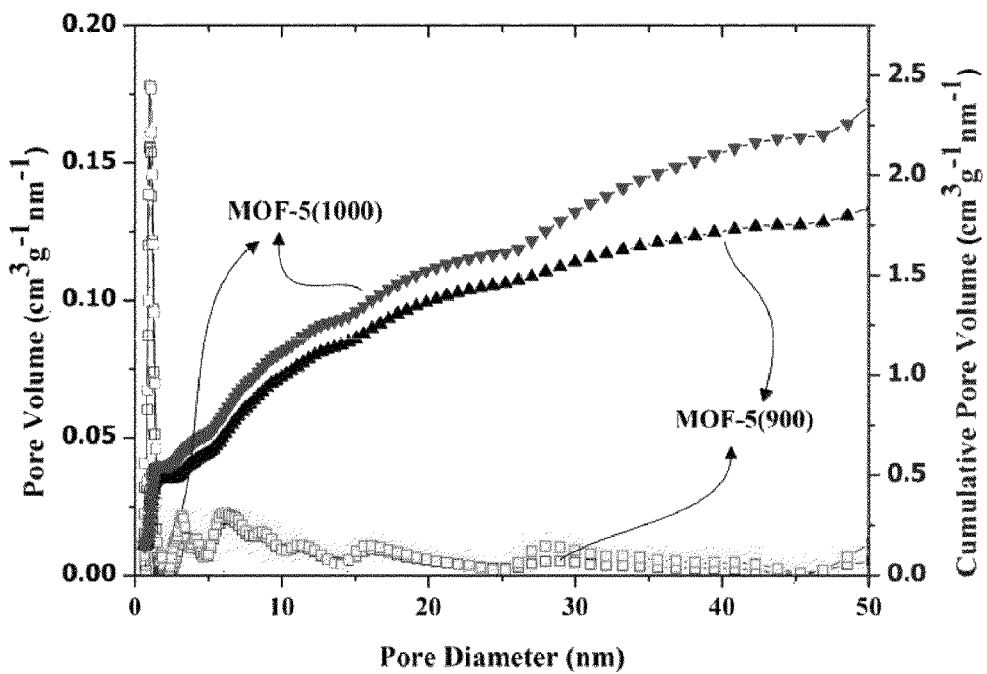

[Figure 3]
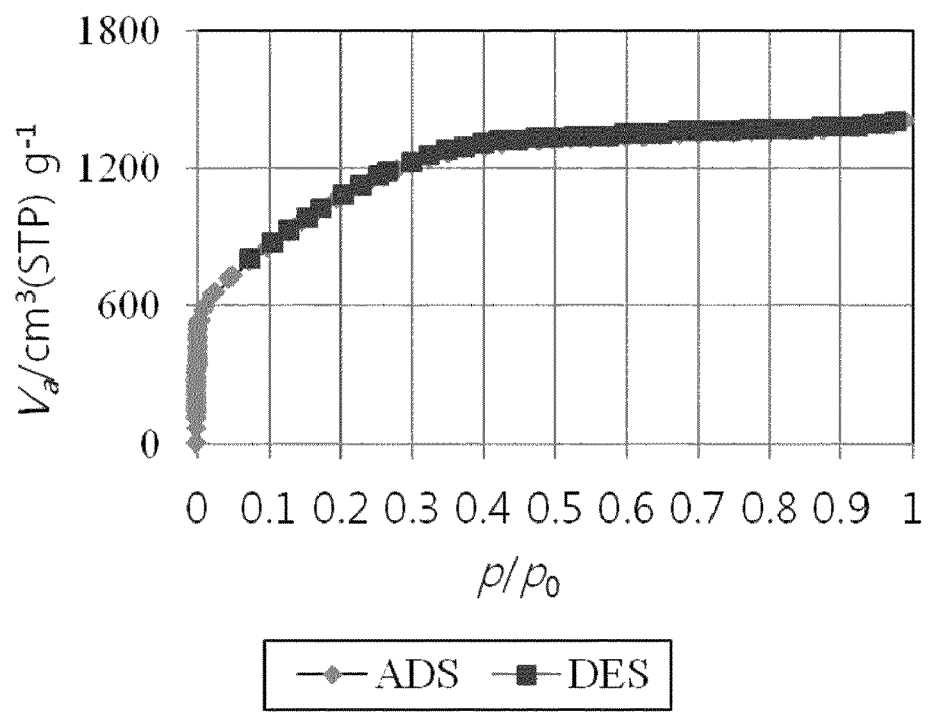

【Figure 4】
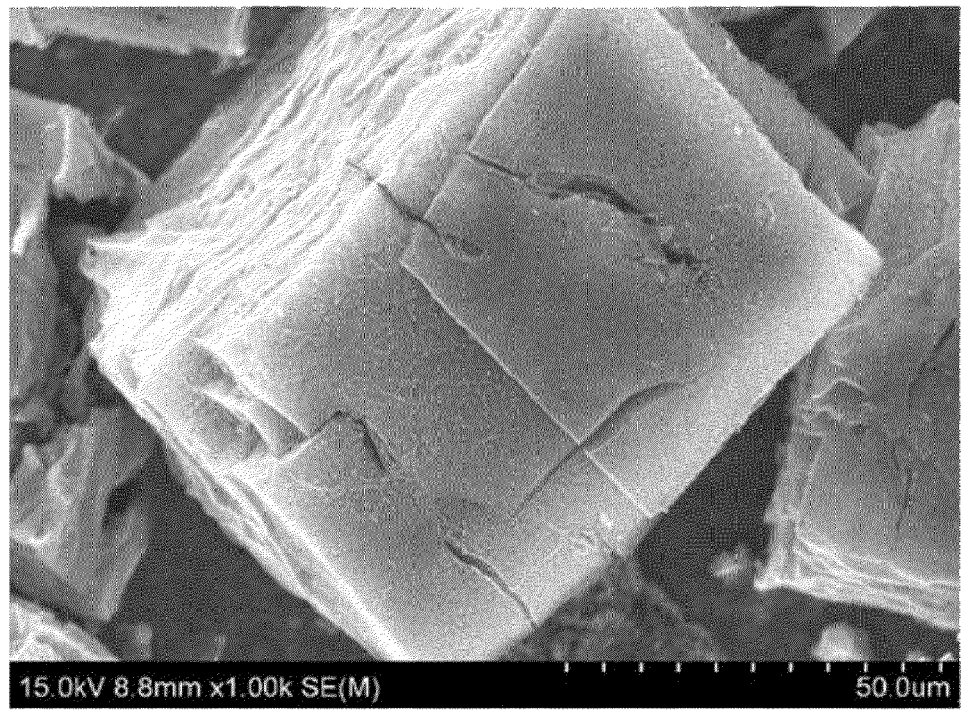
(a)
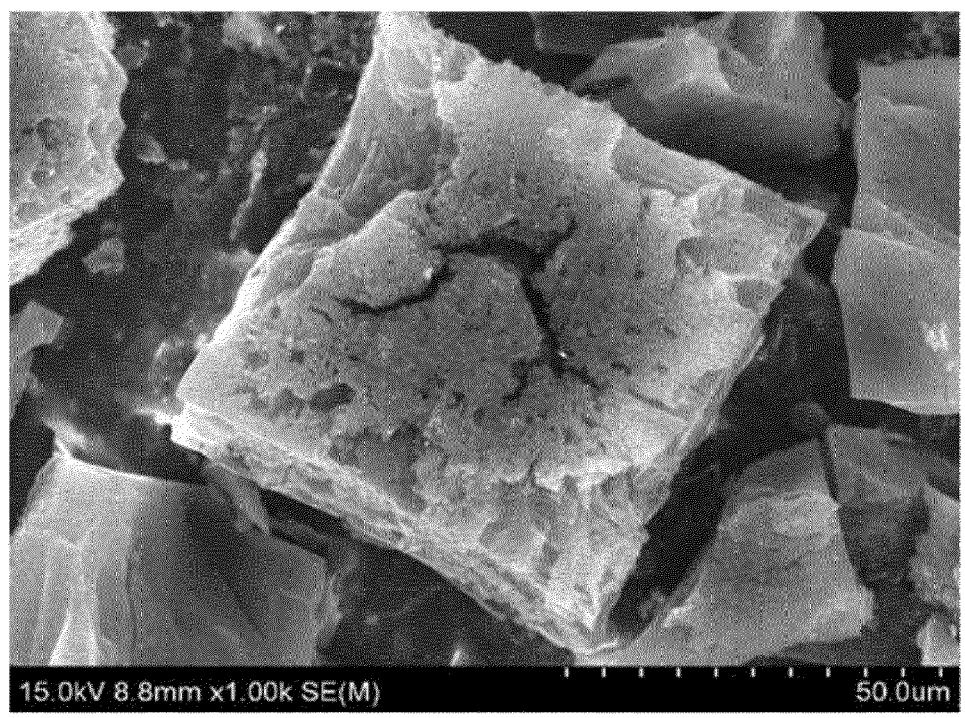
(b)

[Figure 5]
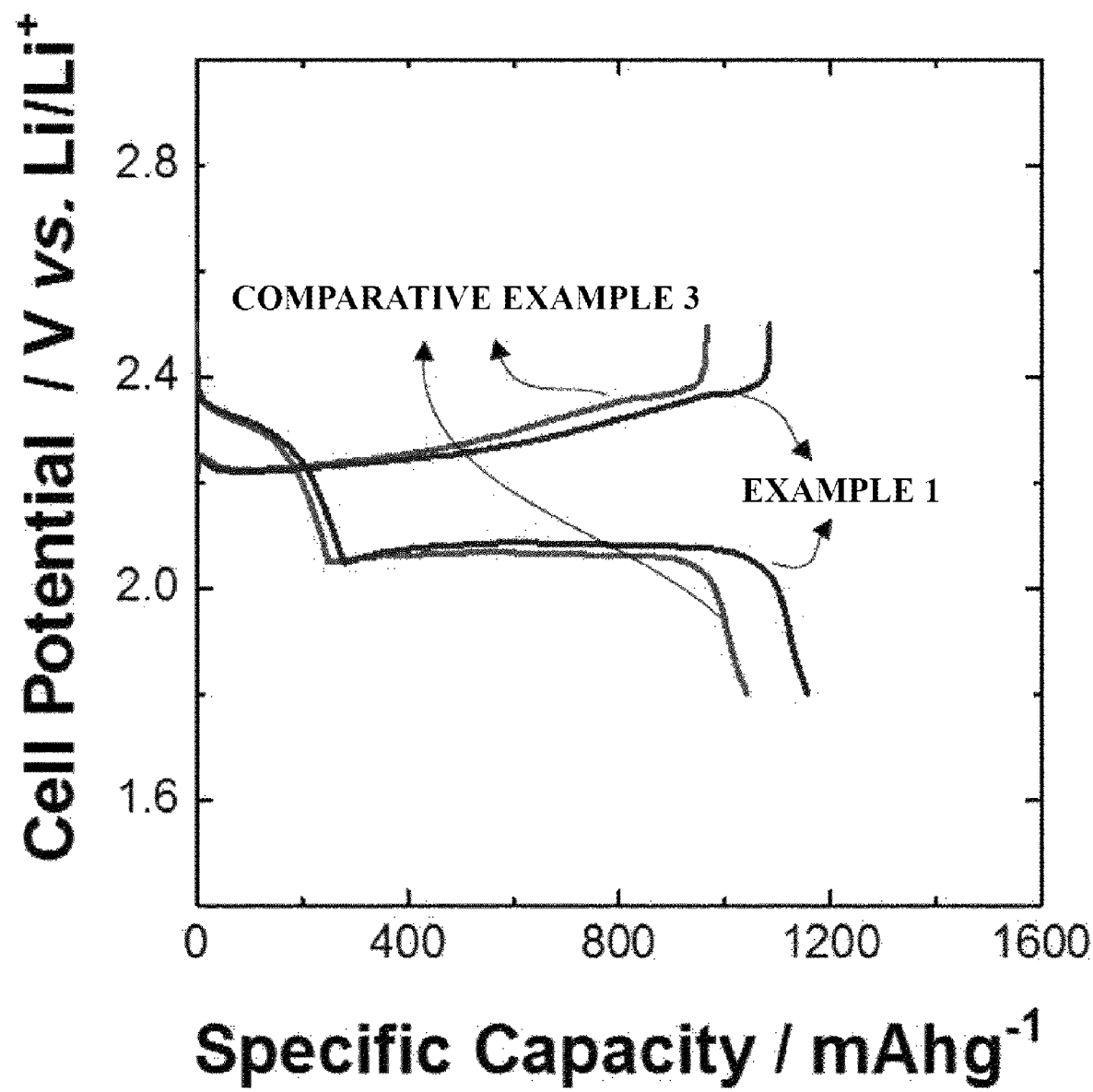

【Figure 6】
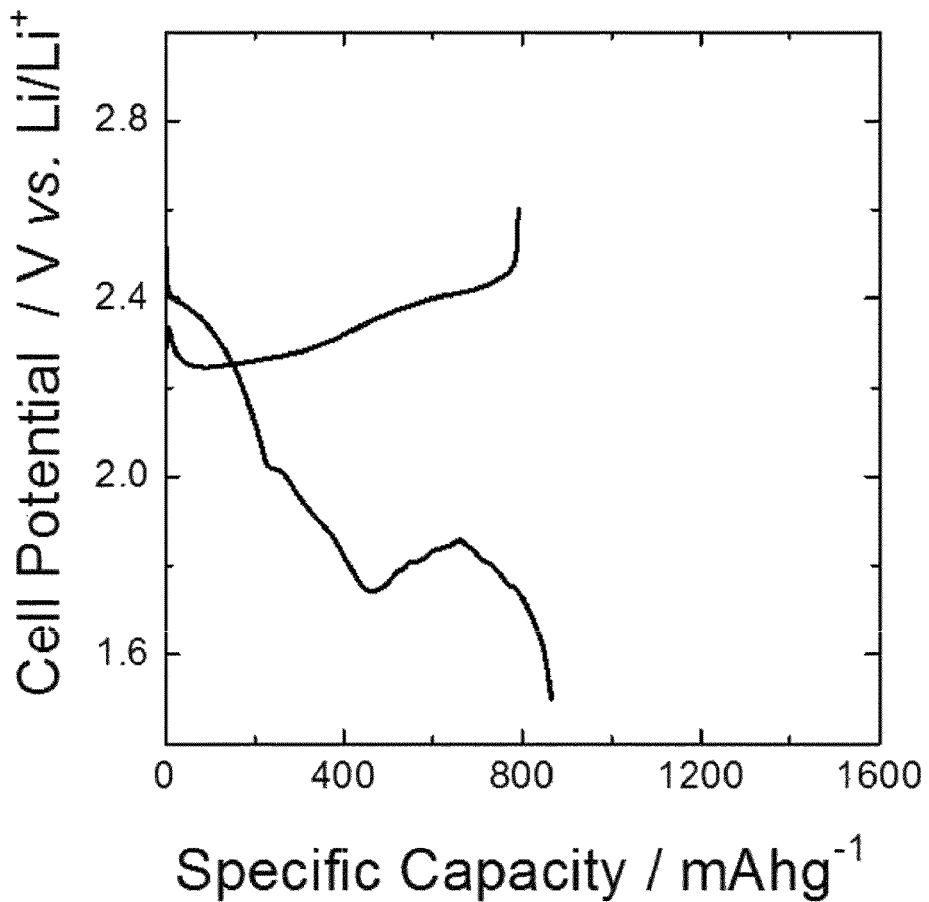
【Figure 7】
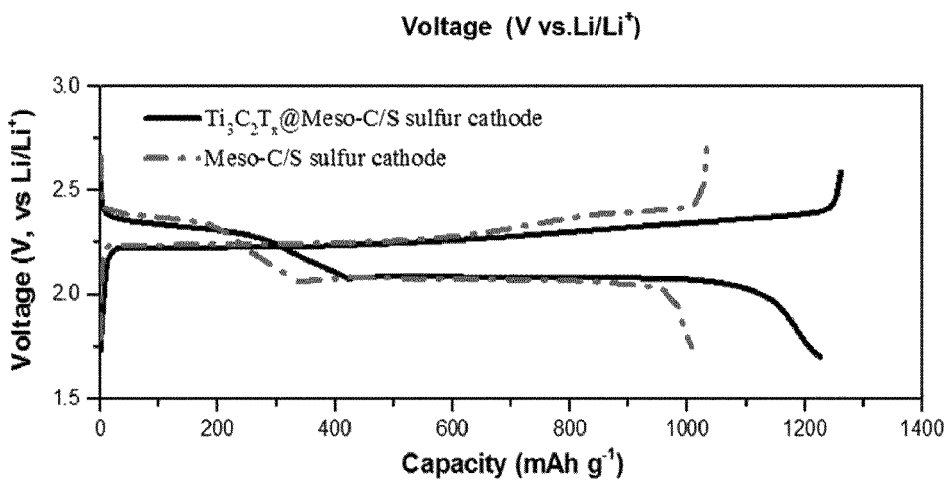

【Figure 8】
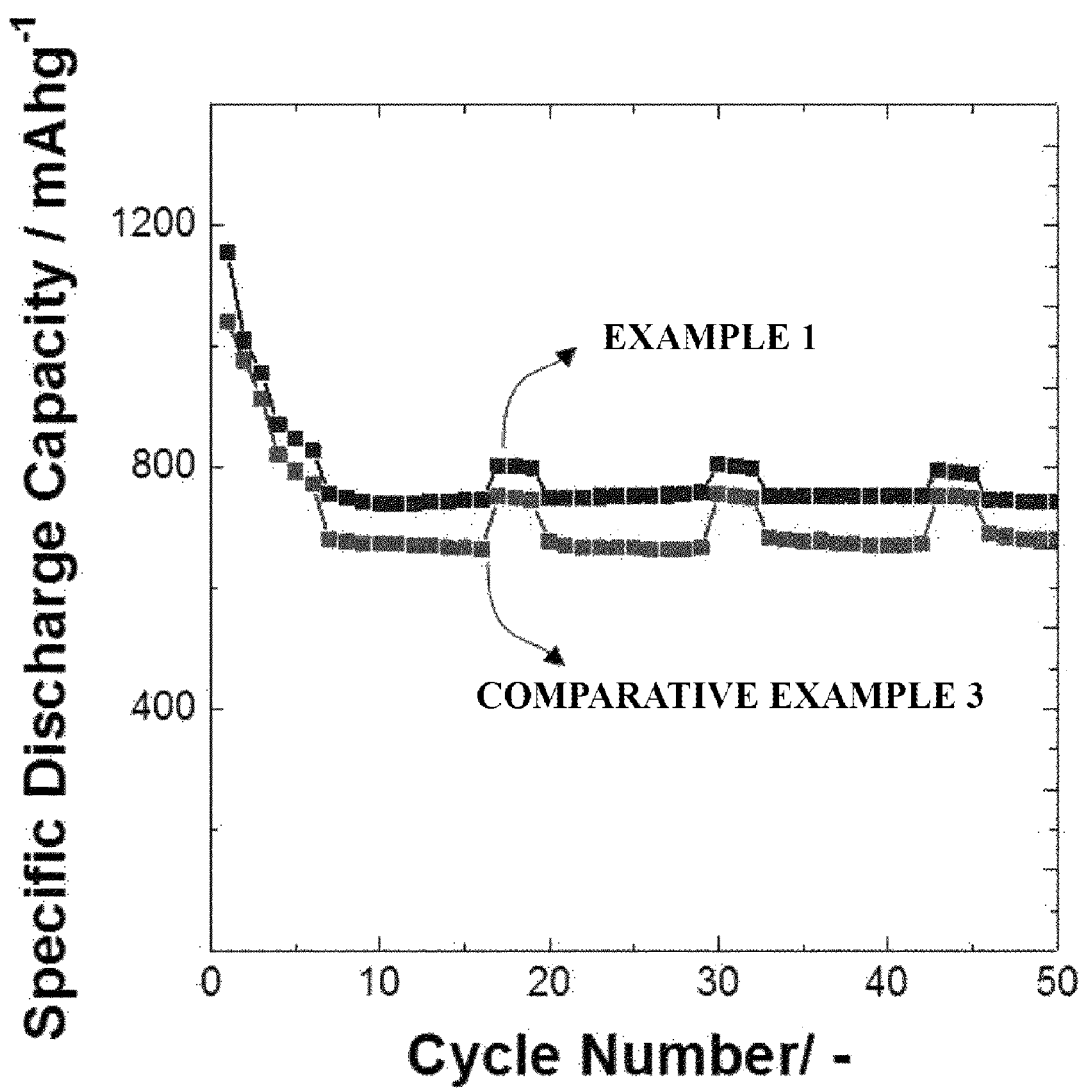

CARBON-SULFUR COMPOSITE, PREPARATION METHOD THEREFOR, AND LITHIUM SECONDARY BATTERY COMPRISING SAME

TECHNICAL FIELD

This application claims priority to and the benefits of Korean Patent Application No. 10-2017-0125909, filed with the Korean Intellectual Property Office on Sep. 28, 2017, the entire contents of which are incorporated herein by reference.

The present invention relates to a carbon-sulfur composite, a method for preparing the same and a lithium secondary battery including the same.

BACKGROUND ART

Interests in energy storage technologies have been increasingly growing recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and specific energy.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous electrolyte solution.

Particularly, lithium-sulfur (Li—S) batteries are a secondary battery using a sulfur series material having sulfur-sulfur bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, is a most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). Sulfur has a cyclic S$_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide (Li$_2$S$_x$, x=8, 6, 4 and 2) from cyclic S$_8$ by the reduction reaction, and as a result, lithium sulfide (Li$_2$S) is lastly produced when such lithium polysulfide is completely reduced. By the process of being reduced to each lithium polysulfide, a discharge behavior of a lithium-sulfur battery shows gradual discharging voltages unlike lithium ion batteries.

However, in such a lithium-sulfur battery, problems of low electric conductivity of sulfur, lithium polysulfide elution and volume expansion problem during charge and discharge and low coulombic efficiency caused therefrom, and a rapid capacity decrease caused from charge and discharge need to be resolved.

Porous carbon materials are widely used in a lithium sulfur battery with a role of providing conductivity by compositing with sulfur, an active material of a lithium sulfur battery. Studies on enhancing battery performance by controlling sizes and volumes of pores formed inside such porous carbon materials have been continuously conducted. Among these, a metal-organic framework (MOF) has an advantage in that porous carbon materials having a high specific surface area of 1000 m$^2$/g to 4000 m$^2$/g may be synthesized by forming pores with various sizes depending on the types of organic molecules or metal atoms forming the MOF. However, as described in Adv. Funct. Mater. 2016, 26, 8746-8756, technologies of using existing MOF materials in a lithium sulfur battery through carbonization have had a problem in that metal carbide needs to be used as well since performance is not favorable when actually used in batteries.

PRIOR ART DOCUMENTS (Non-patent Document 1) "3D Metal Carbide@Mesoporous Carbon Hybrid Architecture as a New Polysulfide Reservoir for Lithium-Sulfur Batteries", Weizhai Bao, Dawei Su, Wenxue Zhang, Xin Guo, and Guoxiu Wang*, Adv. Funct. Mater. 2016, 26, 8746-8756

DISCLOSURE

Technical Problem

As a result of extensive studies in view of the above, the inventors of the present invention have identified carbonization temperature-dependent cell performance by adjusting a temperature of a carbonization process and thereby identified the importance of a carbonization temperature. It was identified that further developing a pore structure by increasing a carbonization temperature becomes an important parameter in cell performance. In view of the above, the inventors of the present invention have identified that, when compositing MOF-5 derived mesoporous carbon with sulfur, an active material, and using the result in a lithium sulfur battery, electrochemical performance of the lithium-sulfur battery such as initial discharge capacity or cycle retaining capacity may be improved, and have completed the present invention.

Accordingly, an aspect of the present invention provides a carbon-sulfur composite capable of enhancing cell performance just by adjusting a carbonization temperature without introducing other methods, and a method for preparing the same.

Technical Solution

According to an aspect of the present invention, there is provided a carbon-sulfur composite including a carbonized metal-organic framework (MOF); and a sulfur compound introduced to at least a part of an outside surface and an inside of the carbonized metal-organic framework, wherein the carbonized metal-organic framework has a specific surface area of 2,000 m²/g to 3,500 m²/g, and the carbonized metal-organic framework has a pore volume of 2.2 cc/g or greater.

According to another aspect of the present invention, there is provided a method for preparing a carbon-sulfur composite including (a) preparing a carbonized metal-organic framework (MOF) by carbonizing a metal-organic framework (MOF) to 950° C. or higher; and (b) preparing a carbon-sulfur composite by mixing the metal-organic framework (MOF) carbonized in (a) with a sulfur compound.

According to another aspect of the present invention, there is provided a positive electrode including the carbon-sulfur composite.

According to still another aspect of the present invention, there is provided a lithium secondary battery including the positive electrode; a negative electrode; and an electrolyte.

Advantageous Effects

The present invention is effective in improving electrochemical performance of a lithium-sulfur battery such as initial discharge capacity or cycle retaining capacity just by adjusting a carbonization temperature without introducing other methods.

DESCRIPTION OF DRAWINGS

FIG. 1 is a graph showing an $N_2$ adsorption/desorption isotherm of sulfur-carbon composites according to an example and a comparative example of the present invention.

FIG. 2 is a graph showing results of quenched solid density functional theory analyses on sulfur-carbon composites according to an example and a comparative example of the present invention.

FIG. 3 is a graph showing an $N_2$ adsorption/desorption isotherm of a sulfur-carbon composite according to another comparative example of the present invention.

FIG. 4 shows SEM images of sulfur-carbon composites according to an example and a comparative example of the present invention.

FIG. 5 is a graph showing initial charge and discharge properties of lithium-sulfur batteries manufactured with sulfur-carbon composites of an example and a comparative example of the present invention.

FIG. 6 is a graph showing initial charge and discharge properties of a lithium-sulfur battery manufactured with a sulfur-carbon composite of another comparative example of the present invention.

FIG. 7 is a graph showing initial charge and discharge properties of a lithium-sulfur battery manufactured with a sulfur-carbon composite of still another comparative example of the present invention.

FIG. 8 is a graph showing charge and discharge efficiency of lithium-sulfur batteries of sulfur-carbon composites according to an example and a comparative example of the present invention.

BEST MODE

Hereinafter, the present invention will be described in detail with reference to accompanying drawings so that those skilled in the art may readily implement the present invention. However, the present invention may be embodied in various different forms, and is not limited to the present specification.

In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

A carbon-sulfur composite of the present invention includes a carbonized metal-organic framework (MOF); and a sulfur compound introduced to at least a part of an outside surface and an inside of the carbonized metal-organic framework.

Carbonized Metal-Organic Framework

The carbon-sulfur composite of the present invention includes a carbonized metal-organic framework (MOF).

A metal-organic framework (MOF) is a porous material forming a one-dimensional, two-dimensional or three-dimensional skeleton by coordinate bonds of inorganic nodes (metal ion or metal oxide cluster) and multitopic organic linkers being crosslinked, and is referred to as a "porous coordination polymer" or a "porous organic-inorganic hybrid material". The metal-organic framework has a coordinately vacant site on a metal center as well as having a well-defined pore, and has been used in adsorbents, gas storage materials, sensors, membranes, functional thin films, drug delivery materials, catalysts, catalyst supports and the like to capture guest molecules or separate molecules, and recently has been actively studied.

Such a metal-organic framework may be normally prepared using a method of a solvothermal method dissolving a metal and an organic ligand precursor in a proper solvent and reacting the result at a high temperature and a high pressure, a vapor diffusion method diffusing and penetrating a different solvent capable of lowering solubility of a precursor-dissolved solvent, a layer diffusion method forming a layer between two solutions containing different precursors to generate diffusion between the two layers, and the like.

The metal-organic framework (MOF) used in the present invention may include a structural unit represented by the following Chemical Formula 1.

 [Chemical Formula 1]

(In Chemical Formula 1,

M is one or more types of metals selected from the group consisting of copper (Cu), zinc (Zn), iron (Fe), nickel (Ni), chromium (Cr), scandium (Sc), cobalt (Co), titanium (Ti), manganese (Mn), vanadium (V), aluminum (Al), magnesium (Mg), gallium (Ga) and indium (In), L is one or more types of organic metal ligands selected from the group consisting of 1,4-benzenedicarboxylate (BDC), 1,3,5-benzenetricarboxlate (BTC), 1,1'-biphenyl-3,3',5,5'- tetracarboxylate (BPTC) and 2-(N,N,N'-tetrakis(4-carboxyphenyl)-biphenyl-4,4'-diamine (TCBTDA), and x is an integer of 2 to 6, and y is an integer of 2 to 12.)

In the present invention, the metal-organic framework is carbonized, and the carbonized metal-organic framework (MOF) is used. A method of carbonizing the metal-organic framework is not particularly limited as long as it is a method capable of including carbon in the metal-organic framework, and preferably, the metal-organic framework (MOF) may be carbonized under a temperature condition of carbonizing to 950° C. or higher.

In the carbonized metal-organic framework (MOF) prepared as above, elements other than carbon in the MOF may be removed through the carbonization process.

The carbonized metal-organic framework of the present invention prepared as above may have a specific surface area of 1000 m²/g to 4000 m²/g, preferably 1500 m²/g to 3000 m²/g, and most preferably 2,000 m²/g to 2,500 m²/g. The specific surface area range being greater than 4000 m²/g has a problem of causing more process time and costs than are necessary to accomplish the specific surface area, and the range being less than 1,000 m²/g has a problem in that sulfur may not be sufficiently loaded.

In addition, the metal-organic framework carbonized as above may have a pore volume of 0.1 cc/g to 10 cc/g or greater, preferably 2.2 cc/g to 3.0 cc/g, and most preferably 2.2 cc/g to 2.5 cc/g. The pore volume range being less than 0.1 cc/g has a problem in that space to load sulfur is not sufficient, and the range being greater than 10 cc/g has a problem in that the specific surface area decreases. The pore volume may be measured using common methods used in the art, and may be preferably measured using a barrett-joyner-halenda (BJH) method, a density functional theory (DFT) method or the like.

Carbon-Sulfur Composite

The carbon-sulfur composite of the present invention includes a sulfur compound introduced to at least a part of an outside surface and an inside of the carbonized metal-organic framework.

Various sulfur compounds used in a lithium-sulfur battery may be used as the sulfur compound, and elemental sulfur ($S_8$), sulfur series compounds or mixtures thereof are included. The sulfur series compound may specifically be selected from the group consisting of solid $Li_2S_n$ ($n \geq 1$)-dissolved catholytes, organosulfur compounds and carbon-sulfur polymers [$(C_2S_x)_n$, x=2.5 to 50, $n \geq 2$].

The carbon-sulfur composite may load sulfur in a high content due to various-sized pores and pores interconnected three-dimensionally and regularly ordered in the framework. Accordingly, when polysulfide having solubility is produced from an electrochemical reaction but is placed inside the carbon-sulfur composite, the three-dimensionally entangled structure is maintained even with polysulfide elution, and a phenomenon of destroying a positive electrode structure may be suppressed. As a result, a lithium-sulfur battery including the sulfur-carbon composite has an advantage of exhibiting high capacity even with high loading. The amount of sulfur loading of the carbon-sulfur composite according to the present invention may be from 1 mg/cm² to 20 mg/cm².

In the carbon-sulfur composite, a weight ratio of the carbonized metal-organic framework and the sulfur compound may be from 9:1 to 1:9, and preferably from 5:5 to 1:9. When the sulfur or sulfur compound content is less than the above-mentioned range, the carbon-sulfur composite content increases, and as the carbon content increases, the amount of a binder added needs to be increased when preparing slurry. The increase in the amount of binder added ultimately increases sheet resistance of an electrode and performs a role of an insulator preventing electron migration, which may decline cell performance. When the sulfur or sulfur compound content is greater than the above-mentioned range, sulfur or sulfur compound that does not bind with the composite aggregates themselves or re-eluted to the composite surface making electron receiving difficult, and direct participation in the electrode reaction may become difficult.

Method for Preparing Carbon-Sulfur Composite Including Carbonized Metal-Organic Framework The carbon-sulfur composite of the present invention is prepared through (a) preparing a carbonized metal-organic framework (MOF) by carbonizing a metal-organic framework (MOF) to 950° C. or higher; and (b) preparing a carbon-sulfur composite by mixing the metal-organic framework (MOF) carbonized in (a) with a sulfur compound.

First, the method for preparing a carbon-sulfur composite of the present invention includes (a) preparing a carbonized metal-organic framework (MOF) by carbonizing a metal-organic framework (MOF) to 950° C. or higher.

In the step (a), the metal-organic framework (MOF) may be carbonized to 950° C. or higher, preferably carbonized to 950° C. to 2,000° C., and more preferably carbonized to 950° C. to 1,500° C.

A method of carbonizing the metal-organic framework is not particularly limited as long as it is a method capable of including carbon in the metal-organic framework, and preferably, the metal-organic framework may be carbonized under the atmosphere such as argon or nitrogen.

When carbonizing the metal-organic framework (MOF) to 950° C. or higher as in the step (a), carbon having a more developed pore structure is prepared, and using such carbon in a lithium sulfur battery has advantages of enhancing initial capacity and enhancing cycle retaining capacity.

The carbonized metal-organic framework (MOF) of the present invention prepared as above may have a specific surface area of 1000 m²/g to 4000 m²/g, preferably 1500 m²/g to 3000 m²/g, and most preferably 2,000 m²/g to 2,500 m²/g. The specific surface area range being greater than 4000 m²/g has a problem of causing more process time and costs than are necessary to accomplish the specific surface area, and the range being less than 1,000 m²/g has a problem in that sulfur may not be sufficiently loaded.

In addition, the carbonized metal-organic framework (MOF) of the present invention prepared as above may have a pore volume of 0.1 cc/g to 10 cc/g or greater, preferably 2.2 cc/g to 3.0 cc/g, and most preferably 2.2 cc/g to 2.5 cc/g. The pore volume range being less than 0.1 cc/g has a problem in that space to load sulfur is not sufficient, and the range being greater than 10 cc/g has a problem in that the specific surface area decreases. The pore volume may be measured using common methods used in the art, and may be preferably measured using a barrett-joyner-halenda (BJH) method, a density functional theory (DFT) method or the like.

Other properties of the metal-organic framework (MOF) used in the step (a) are the same as examined above.

After that, the carbon-sulfur composite of the present invention includes (b) preparing a carbon-sulfur composite by mixing the metal-organic framework (MOF) carbonized in (a) with a sulfur compound.

In the step (b), the method of mixing the sulfur compound is not particularly limited in the present invention, and known methods may be used.

As one example of the method of mixing the sulfur compound, the carbonized metal-organic framework and a sulfur compound powder may be uniformly mixed, the mixture is heated, and the melted sulfur compound may be impregnated into the carbonized metal-organic framework.

Herein, the sulfur compound may be mixed by flowing into the carbonized metal-organic framework close by through a capillary phenomenon.

The heating temperature may be from 115° C. to 180° C., and more specifically from 150° C. to 160° C. According to one embodiment, the sulfur may also be uniformly coated around the carbonized metal-organic framework rather than voids between the carbonized metal-organic frameworks.

The heating time may be adjusted depending on the content of the sulfur compound and the content of the carbonized metal-organic framework, and for example, the heating time may be 10 seconds or longer or 30 seconds or longer, and 2 hours or shorter, 1 hour or shorter, 30 minutes or shorter or 10 minutes or shorter.

When the melting temperature is lower than 115° C., the sulfur compound particles are not melted, and the sulfur compound may not be properly impregnated into the carbonized metal-organic framework.

The impregnating of the sulfur compound may be carried out by dissolving a sulfur compound in an organic solvent, and then growing the sulfur compound through adding the carbonized metal-organic framework.

The organic solvent may be one selected from the group consisting of ethanol, toluene, benzene, N-methyl-2-pyrrolidone (NMP), dimethyl sulfoxide (DMSO), acetone, chloroform, dimethylformamide, cyclohexane, tetrahydrofuran and methylene chloride, or a mixed solvent of two or more thereof.

The impregnating of the sulfur compound may be carried out by mixing the carbonized metal-organic framework and a sulfur compound powder and impregnating using a ball mill method.

The mixing method may be carried out by introducing to a powder mixer for a certain period of time. Herein, the mixing time may be 10 minutes or longer or 30 minutes or longer, and 10 hours or shorter, 5 hours or shorter or 2 hours or shorter.

When mixing the carbonized metal-organic framework and the sulfur compound, a weight ratio of the carbonized metal-organic framework and the sulfur compound may be from 9:1 to 1:9, and preferably from 5:5 to 1:9. When the sulfur or sulfur compound content is less than the above-mentioned range, the carbon-sulfur composite content increases, and as the carbon content increases, the amount of a binder added needs to be increased when preparing slurry. The increase in the amount of binder added ultimately increases sheet resistance of an electrode and performs a role of an insulator preventing electron migration, which may decline cell performance. When the sulfur or sulfur compound content is greater than the above-mentioned range, sulfur or sulfur compound that does not bind with the composite aggregates themselves or re-eluted to the composite surface making electron receiving difficult, and direct participation in the electrode reaction may become difficult.

Positive Electrode

The carbon-sulfur composite provided in the present invention is used as a positive electrode active material of a lithium secondary battery, and preferably, may be used as a positive electrode active material of a lithium-sulfur battery.

A lithium-sulfur battery includes sulfur as a positive electrode active material, and this has a problem of lithium polysulfide elution during charge and discharge. In the carbon-sulfur composite according to the present invention, sulfur may be uniformly distributed in the framework, and sulfur may be loaded in a high content due to pores with various sizes and pores interconnected three-dimensionally and regularly ordered. Accordingly, a three-dimensionally entangled structure is maintained even with polysulfide elution, and a phenomenon of destroying a positive electrode structure may be suppressed. As a result, a lithium-sulfur battery including the carbon-sulfur composite has an advantage of obtaining high capacity even with high loading.

The positive electrode is prepared by coating a composition for forming a positive electrode active material layer on a positive electrode current collector and drying the result. The composition for forming a positive electrode active material layer may be prepared by mixing the carbon-sulfur composite described above, a conductor, a binder and a solvent.

Specifically, in order to additionally provide conductivity to the prepared carbon-sulfur composite, a conductor may be further added to the positive electrode composition. The conductor performs a role for electrons to smoothly migrate in the positive electrode, and is not particularly limited as long as it has excellent conductivity and is capable of providing a large surface area without inducing chemical changes to a battery, however, carbon-based materials are preferably used.

As the carbon-based material, one type selected from the group consisting of graphite-based such as natural graphite, artificial graphite, expanded graphite or graphene, active carbon-based, carbon black-based such as channel black, furnace black, thermal black, contact black, lamp black or acetylene black; carbon fiber-based, carbon nanostructures such as carbon nanotubes (CNT) or fullerene, and combinations thereof may be used.

In addition to the carbon-based material, metallic fibers such as metal mesh; metallic powders such as copper (Cu), silver (Ag), nickel (Ni) and aluminum (Al); or organic conductive materials such as polyphenylene derivatives may also be used depending on the purpose. The conductive materials may be used either alone or as a mixture.

In addition, in order to provide adhesion for a current collector to the positive electrode active material, a binder may be further included in the positive electrode composition. The binder needs to be favorably dissolved in a solvent, and needs to have proper impregnability of an electrolyte liquid as well as favorably forming a conductive network with the positive electrode active material and the conductor.

The binder capable of being used in the present invention may be all binders known in the art, and specifically, may be one type selected from the group consisting of fluororesin-based binders including polyvinylidene fluoride (PVdF) or polytetrafluoroethylene (PTFE); rubber-based binders including styrene-butadiene rubber, acrylonitrile-butadiene rubber or styrene-isoprene rubber; cellulose-based binders including carboxymethylcellulose (CMC), starch, hydroxypropylcellulose or regenerated cellulose; polyalcohol-based binders; polyolefin-based binders including polyethylene or polypropylene; polyimide-based binders, polyester-based binders and silane-based binders, or mixtures or copolymers of two or more types thereof, but is not limited thereto.

The content of the binder resin may be from 0.5% by weight to 30% by weight based on the total weight of the positive electrode for a lithium-sulfur battery, but is not limited thereto. When the binder resin content is less than 0.5% by weight, physical properties of the positive electrode may decline eliminating the positive electrode active material and the conductor, and when the content is greater than 30% by weight, ratios of the active material and the conductor relatively decrease in the positive electrode reducing battery capacity.

The solvent for preparing the positive electrode composition for a lithium-sulfur battery in a slurry state needs to be readily dried, and most preferably maintains the positive electrode active material and the conductor in a dispersed state without dissolution while favorably dissolving the binder. When the solvent dissolves the positive electrode active material, sulfur goes under in the slurry since sulfur has high specific gravity (D=2.07) in the slurry, and sulfur is crowded on the current collector when coating causing a problem in the conductive network, and battery operation tends to have a problem.

As the solvent according to the present invention, water or organic solvents may be used, and as the organic solvent, organic solvents including one or more types selected from the group consisting of dimethylformamide, isopropyl alcohol, acetonitrile, methanol, ethanol and tetrahydrofuran may be used.

As for the mixing of the positive electrode composition, common methods may be used for the stirring using common mixers such as a paste mixer, a high shear mixer and a homo-mixer.

The positive electrode for a lithium-sulfur battery may be formed by coating the positive electrode composition on a current collector, and vacuum drying the result. The slurry may be coated on the current collector to a proper thickness depending on the viscosity of the slurry and the thickness of the positive electrode to form, and preferably, the thickness may be properly selected in the range of 10 μm to 300 μm.

Herein, the method of coating the slurry is not limited, and for example, methods of doctor blade coating, dip coating, gravure coating, slit die coating, spin coating, comma coating, bar coating, reverse roll coating, screen coating, cap coating or the like may be carried out for the preparation.

The positive electrode current collector is not particularly limited as long as it may be prepared to generally have a thickness of 3 μm to 500 μm, and has high conductivity without inducing chemical changes to a battery. For example, conductive metals such as stainless steel, aluminum, copper or titanium may be used, and preferably, an aluminum current collector may be used. Such a positive electrode current collector may have various forms such as films, sheets, foil, nets, porous bodies, foams or non-woven fabrics.

Lithium-Secondary Battery

As one embodiment of the present invention, the lithium-secondary battery may include the positive electrode described above; a negative electrode including lithium metal or an lithium alloy as a negative electrode active material; a separator provided between the positive electrode and the negative electrode; and an electrolyte impregnated into the negative electrode, the positive electrode and the separator, and including a lithium salt and an organic solvent.

The negative electrode may use a material capable of reversibly intercalating or deintercalating lithium ions ($Li^+$), a material capable of reversibly forming a lithium-containing compound by reacting with lithium ions, lithium metal or a lithium alloy as a negative electrode active material. Examples of the material capable of reversibly intercalating or deintercalating lithium ions may include crystalline carbon, amorphous carbon or a mixture thereof. Examples of the material capable of reversibly forming a lithium-containing compound by reacting with lithium ions may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, while charging and discharging a lithium-sulfur battery, sulfur used as a positive electrode active material may be changed to an inactive material and attached on a lithium negative electrode surface. Inactive sulfur means sulfur that has gone through various electrochemical or chemical reactions and is not able to participate in an electrochemical reaction of a positive electrode any more, and the inactive sulfur formed on the lithium negative electrode surface has an advantage of performing a role of a protective layer of the lithium negative electrode. Accordingly, lithium metal and inactive sulfur formed on this lithium metal, for example, lithium sulfide, may be used as the negative electrode.

The negative electrode of the present invention may additionally further include, in addition to the negative electrode active material, a pretreatment layer formed with a lithium ion conductive material, and a lithium metal protective layer formed on the pretreatment layer.

The separator provided between the positive electrode and the negative electrode separates or insulates the positive electrode and the negative electrode from each other, and enables lithium ion transfer between the positive electrode and the negative electrode, and may be formed with porous non-conductive or insulating materials. As an insulator having high ion permeability and mechanical strength, such a separator may be an independent member such as a thin film or a film, or a coating layer added to the positive electrode and/or the negative electrode. In addition, when using a solid electrolyte such as a polymer as the electrolyte, the solid electrolyte may also be used as the separator.

The separator preferably has a pore diameter of generally 0.01 μm to 10 μm and a thickness of generally 5 μm to 300 μm, and as such a separator, a glass electrolyte, a polymer electrolyte, a ceramic electrolyte or the like may be used. For example, olefin-based polymers having chemical resistance and hydrophobicity such as polypropylene, glass fiber, or sheets, non-woven fabrics, kraft papers and the like made of polyethylene and the like are used. Typical examples commercially available may include Celgard series (Celgard®2400, 2300, product of Hoechest Celanese Corp.), polypropylene separator (product of Ube Industries Ltd. or product of Pall RAI), polyethylene series (Tonen or Entek) and the like.

The electrolyte separator in a solid state may include a non-aqueous organic solvent in approximately less than 20% by weight, and in this case, a proper gelling agent may be further included in order to reduce fluidity of the organic solvent. Typical examples of such a gelling agent may include polyethylene oxide, polyvinylidene fluoride, polyacrylonitrile and the like.

The electrolyte impregnated into the negative electrode, the positive electrode and the separator is, as a lithium salt-containing non-aqueous electrolyte, formed with a lithium salt and an electrolyte liquid, and as the electrolyte liquid, non-aqueous organic solvents, organic solid electrolytes, inorganic solid electrolytes and the like are used.

The lithium salt of the present invention may include, as a material favorably dissolved in a non-aqueous organic solvent, may include one or more selected from the group consisting of $LiSCN$, $LiCl$, $LiBr$, $LiI$, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenylborate, lithium imide and combinations thereof.

The concentration of the lithium salt may be from 0.2 M to 2 M, specifically from 0.6 M to 2 M and more specifically from 0.7 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When used in less than 0.2 M, conductivity of the electrolyte may decrease causing decline in the electrolyte performance, and when used in greater than 2 M, viscosity of the electrolyte increases leading to a decrease in the lithium ion (Lit) mobility.

The non-aqueous organic solvent needs to favorably dissolve the lithium salt, and examples of the non-aqueous organic solvent of the present invention may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyalginate lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS), fluoro-propylene carbonate (FPC) and the like may be further included.

The electrolyte may be used as a liquid-state electrolyte or as an electrolyte separator form in a solid state. When using as a liquid-state electrolyte, a separator formed with porous glass, plastics, ceramics or polymers is further included as a physical separator having a function of physically separating electrodes.

DETAILED DESCRIPTION OF THE INVENTION

Hereinafter, preferred examples are provided in order to illuminate the present invention, however, the following examples are for illustrative purposes only, and it is obvious to those skilled in the art that various changes and modifications may be made within the category and technological ideas of the present invention, and such changes and modifications also fall within the scope of the attached claims.

EXAMPLE

Preparation of Sulfur-Carbon Composite

Example 1

0.8 g of $Zn(NO_3)_2 \cdot 6H_2O$ and 0.149 g of 1,4-benzenedicarboxylic acid ($H_2BDC$) (molar ratio=3:1) were introduced to a 50 mL container with 30 mL of DMF. The reaction solution was heated for 1 day in a 120° C. oven. A crystalline product was washed twice with DMF and MC. The crystalline product was washed several times with anhydrous DMF and anhydrous MC. The product was dried overnight in a 150° C. vacuum oven to prepare a metal-organic framework (MOF-5) (0.28 g, yield=91%).

The obtained metal-organic framework was placed in an oven and then carbonized for 6 hours at 1,000° C. By using the obtained carbonized metal-organic framework, sulfur and the carbonized metal-organic framework were mixed to have a weight ratio of 7:3, and the result was heat treated for 30 minutes at 155° C. to prepare a sulfur-carbon composite.

Comparative Example 1

A sulfur-carbon composite was prepared in the same manner as in Example 1 except that the sulfur-carbon composite was prepared using activated carbon instead of the carbonized metal-organic framework.

Comparative Example 2

A sulfur-carbon composite was prepared in the same manner as in Example 1 except that a $Ti_3C_2T_x$@Meso-C/S composite prepared using a method of "Adv. Funct. Mater. 2016, 26, 8746-8756" was used instead of the carbonized metal-organic framework.

Comparative Example 3

A sulfur-carbon composite was prepared in the same manner as in Example 1 except that the metal-organic framework was placed in an oven and then carbonized at 900° C.

Experimental Example 1: Evaluation on Properties of Carbonized Metal-Organic Framework (Analysis on Surface Photographing)

For the sulfur-carbon composite (MOF-5 (1000)) prepared in Example 1 and the sulfur-carbon composite (MOF-5 (900)) prepared in Comparative Example 3, SEM images were photographed (HITACHI S-4800), and the results are shown in a of FIG. 4 (Example 1) and b of FIG. 4 (Comparative Example 3).

(Analysis on $N_2$ Adsorption/Desorption Isotherm)

To each of the carbonized metal-organic framework (MOF-(1000)) prepared in Example 1 and the carbonized metal-organic framework (MOF-5 (900)) prepared in Comparative Example 3, vacuum was applied for 2 hours at room temperature, and an $N_2$ adsorption/desorption isotherm was measured (AUTOSORB-iQ-MP instrument, manufactured by Quantachrome Instruments), and the results are shown in FIG. 1. An $N_2$ adsorption/desorption isotherm for the activated carbon prepared in Comparative Example 1 is shown in FIG. 3.

Through FIG. 1, it was seen that the carbonized metal-organic framework (MOF-5 (1000)) prepared in Example 1 had a relatively larger specific surface area compared to the carbonized metal-organic framework (MOF-5 (900)) prepared in Comparative Example 3. In addition, through FIG. 3, it was seen that they both had a relatively smaller specific surface area compared to the activated carbon prepared in Comparative Example 1.

(Analysis on Quenched Solid Density Functional Theory)

For the carbonized metal-organic framework (MOF-5 (1000)) prepared in Example 1 and the carbonized metal-organic framework (MOF-5 (900)) prepared in Comparative Example 3, pore size distribution is shown in FIG. 2 using a quenched solid density functional theory (QSDFT) method (slit/cylindrical/sphere pores) (AUTOSORB-iQ-MP instrument, manufactured by Quantachrome Instruments).

Through FIG. 2, it was seen that the carbonized metal-organic framework (MOF-5 (1000)) prepared in Example 1 contained more meso-sized pores compared to the carbonized metal-organic framework (MOF-5 (900)) prepared in Comparative Example 3.

Through the results, a carbonization temperature-dependent BET was obtained, and the results are shown in Table 1.

TABLE 1

|  | Carbonization Temperature | Specific Surface Area [m²/g] | Pore Volume [cc/g] |
| --- | --- | --- | --- |
| Example 1 | MOF-5 (1000° C.) | 2178 | 2.36 |
| Comparative Example 3 | MOF-5 (900° C.) | 1947 | 1.844 |
| Comparative Example 1 | Activated Carbon | 3890 | 2.17 |

Experimental Example 2

Evaluation on Battery Performance

Using the prepared sulfur-carbon composite, slurry was prepared with the sulfur-carbon composite:conductor:binder in a weight ratio of 90:5:5, and the slurry was coated on aluminum foil current collector having a thickness of 20 μm to prepare an electrode. Herein, carbon black was used as the conductor, styrene butadiene rubber and carboxymethylcellulose were used as the binder, and the loading amount was 3 mAh/cm².

(Evaluation on Battery Performance)

For the lithium-sulfur battery manufactured using each of the sulfur-carbon composite (MOF-5 (1000)) prepared in Example 1 and the sulfur-carbon composites (MOF-5 (900)) prepared in Comparative Examples 1 to 3, changes in the charge and discharge properties were tested using a charge and discharge measurement device. Using the obtained battery, initial discharge/charge was progressed with 0.1 C/0.1 C for 2.5 cycles, then 3 cycles was performed with 0.2 C/0.2 C, and thereafter, 10 cycles with 0.5 C/0.3 C and 3 cycles with 0.2 C/0.2 C were repeated. The results were measured and are shown in FIG. 5 to FIG. 8.

FIG. 5 is a graph showing initial charge and discharge properties of the lithium-sulfur batteries manufactured in Example 1 and Comparative Example 3, FIG. 6 is a graph showing initial charge and discharge properties of the lithium-sulfur battery manufactured in Comparative Example 1, and FIG. 7 is a graph showing initial charge and discharge properties of the lithium-sulfur battery manufactured in Comparative Example 2.

When referring to FIG. 5, the lithium-sulfur battery manufactured using the sulfur-carbon composite of Example 1 prepared carbon with a more developed pore structure as the carbonization temperature of the metal-organic framework (MOF) increased to 1000° C., and used the carbon in a lithium sulfur battery, and it was seen that Example 1 had enhanced initial capacity and enhanced cycle retaining capacity compared to Comparative Example 3 having a less developed pore structure.

On the other hand, when referring to FIG. 6, it was seen that the lithium-sulfur battery manufactured using the sulfur-carbon composite of Comparative Example 1 did not exhibit initial discharge capacity while a discharge overvoltage was highly applied. This indicates that, as well as a BET and a pore volume that carbon has, the pore distribution has significant effects on cell performance. In other words, this is due to the fact that, in the activated carbon, micropores have dominant distribution.

In addition, when referring FIG. 7, it was seen that the sulfur-carbon composite of Comparative Example 2 was prepared in a similar manner as in Example 1, but had initial capacity of approximately 1000 mAh/g, which is lower than Example 1.

FIG. 8 is a graph showing charge and discharge efficiency of the lithium-sulfur batteries manufactured in Example 1 and Comparative Example 3. When referring to FIG. 8, it was seen that the lithium-sulfur battery manufactured using the sulfur-carbon composite of Example 1 had higher discharge retaining capacity when progressing the cycle.

The invention claimed is:

1. A carbon-sulfur composite comprising:
   a carbonized metal-organic framework; and
   a sulfur compound introduced to at least a part of an outside surface and an inside of the carbonized metal-organic framework,
   wherein the carbonized metal-organic framework has a specific surface area of 2,000 m²/g to 2,500 m²/g according to BET analysis,
   the carbonized metal-organic framework has a pore volume of 2.2 cc/g to 3.0 cc/g; and
   the metal-organic framework comprises a structural unit represented by the following Chemical Formula 1:

wherein M is one or more metal selected from the group consisting of copper (Cu), zinc (Zn), iron (Fe), nickel (Ni), chromium (Cr), scandium (Sc), cobalt (Co), titanium (Ti), manganese (Mn), vanadium (V), aluminum (Al), magnesium (Mg), gallium (Ga) and indium (In);
   L is one or more organic metal ligand selected from the group consisting of 1,4-benzenedicarboxylate (BDC), 1,3,5-benzenetricarboxlate (BTC), 1,1'-biphenyl-3,3',5,5'-tetracarboxylate (BPTC) and 2-(N, N, N', N'-tetrakis (4-carboxyphenyl)-biphenyl-4,4'-diamine (TCBTDA); and
   x is an integer of 2 to 6, and y is an integer of 2 to 12.

2. The carbon-sulfur composite of claim 1, wherein the carbonized metal-organic framework and the sulfur compound are present in a weight ratio of 9:1 to 1:9.

3. A method for preparing the carbon-sulfur composite according to claim 1, comprising:
   (a) preparing a carbonized metal-organic framework by carbonizing a metal-organic framework at a temperature of 1000° C. to 2000° C.; and
   (b) preparing a carbon-sulfur composite by mixing the carbonized metal-organic framework of (a) with a sulfur compound.

4. The method for preparing a carbon-sulfur composite of claim 3, wherein, in (a), the metal-organic framework is carbonized at 1000° C. to 1,500° C.

5. The method for preparing a carbon-sulfur composite of claim 3, wherein, in (b), the carbonized metal-organic framework and the sulfur compound are mixed in a weight ratio of 9:1 to 1:9.

6. A positive electrode comprising the carbon-sulfur composite of claim 1.

7. The positive electrode of claim 6, which is suitable for a lithium-sulfur battery.

8. A lithium secondary battery comprising:
the positive electrode of claim 6;
a negative electrode; and
an electrolyte.

* * * * *